Dec. 21, 1965   G. E. THOMPSON   3,224,531
SPREADING TYPE DISC BRAKES
Filed Jan. 9, 1964   2 Sheets-Sheet 1
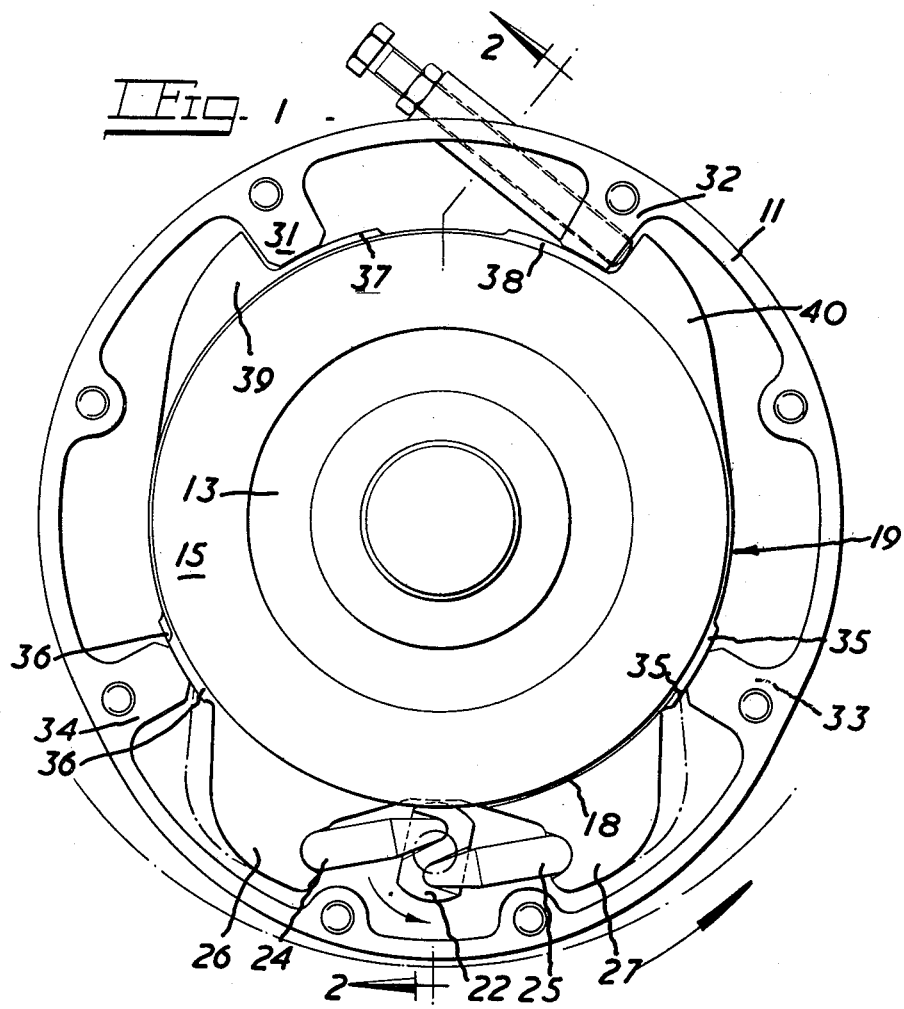
George Eric Thompson
BY Scrivener, Parker, Scrivener + Clarke

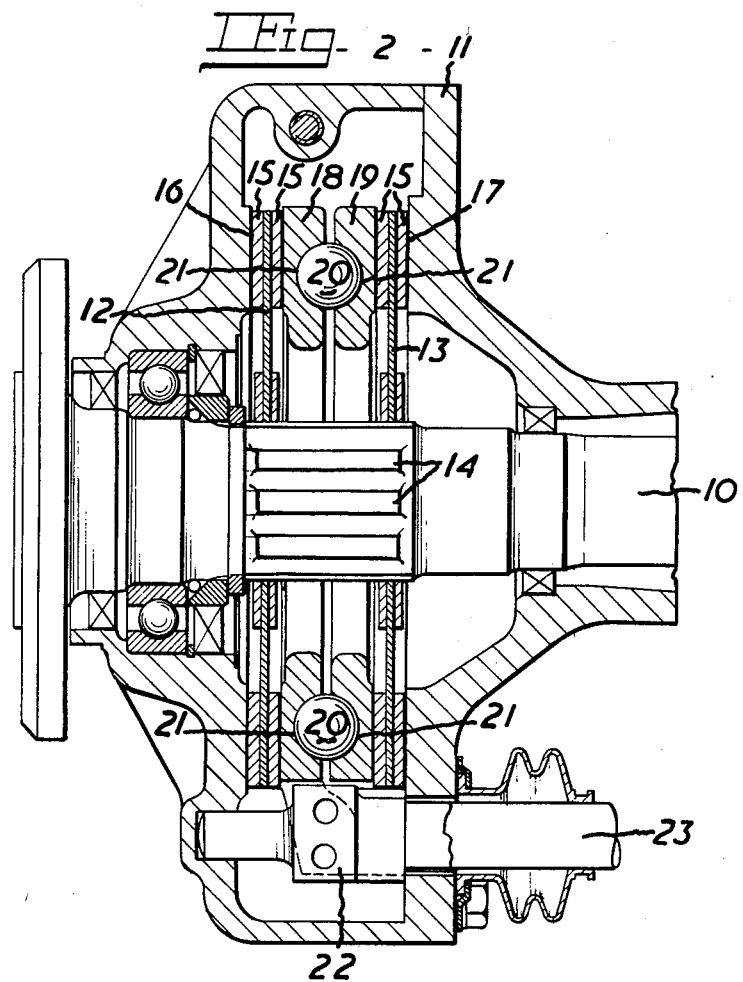

United States Patent Office 3,224,531
Patented Dec. 21, 1965

3,224,531
SPREADING TYPE DISC BRAKES
George Eric Thompson, Edgbaston, Birmingham, England, assignor to Girling Limited, Birmingham, England, a British company
Filed Jan. 9, 1964, Ser. No. 336,659
Claims priority, application Great Britain, Jan. 9, 1963, 986/63
4 Claims. (Cl. 188—72)

This invention relates to improvements in disc brakes of the kind in which rotatable discs keyed to but axially movable on a shaft are gripped between axially separable pressure plates and radial surfaces in a stationary housing. Balls or rollers are located in co-operating inclined or conical recesses in the adjacent faces of the pressure plates to urge them apart on relative angular movement between the plates. The application of the brake is initiated by moving the pressure plates angularly in opposite directions until they engage the discs. The plates then tend to be carried round with the discs until an abutment on one or other of the plates, according to the direction of rotation of the disc, engages a stop abutment on the housing, and the continued angular movement of the other plate with the discs causes the plates to be urged apart by the balls or rollers to apply the brake.

The pressure plates are usually located and supported by three angularly spaced guides or pilots which project radially inwards from the housing and with which machined portions of the peripheries of the plates co-operate, the guides being spaced apart at angles of 120°.

According to our invention, in a brake of that kind one of the guides or pilots is replaced by two angularly spaced guides or pilots of which at least one co-operates with one of the pressure plates and the other with the other pressure plate.

Each plate is thus directly supported at three positions as before and is also supported indirectly from the other plate by the spigot effect of the balls or rollers engaging in the co-operating recesses in the plates.

Preferably the two spaced guides or pilots replace the guide or pilot which is normally diametrically opposite the means for actuating the plates and are equally spaced from that position, and they may conveniently form the stop abutments with which radial lugs or ears on the respective plates engage.

One practical form of brake in accordance with our invention is illustrated by way of example in the accompanying drawings in which:

FIGURE 1 is a side elevation of the brake viewed from the outboard side with its cover removed; and FIGURE 2 is a section on the line 2—2 of FIGURE 1.

In the brake illustrated 10 is a shaft such as a half-shaft in a vehicle transmission and is rotatably mounted in a stationary housing 11 which may be part of an axle casing.

Two axially spaced discs 12, 13 are slidably keyed on the shaft by means of splines 14 and rotate with the shaft. Rings of friction material 15 are bonded or otherwise secured to opposite faces of each disc. The rings co-operate with flat radial surfaces 16 and 17 on the end walls of the housing 11 and with similar radial surfaces on pressure plates comprising rings 18 and 19 located between the discs. Balls 20 are located between the rings and co-operate with conical or inclined recesses 21 in the adjacent faces of the rings whereby on relative angular movement between the rings they are urged apart to grip the discs between themselves and the end walls of the housing.

Relative angular movement of the rings 18 and 19 in opposite directions to initiate the application of the brake is effected by angular movement of a cam 22 mounted on a shaft 23 in the housing on one side of the axis of the rings and which urges apart thrust members or dollies 24 and 25 of which the thrust member 24 acts on a radially projecting abutment or ear 26 on the ring 19 and thrust member 25 acts on a radially projecting abutment or ear 27 on the ring 18. The shaft 23 is parallel to the shaft 10 and is permitted a limited floating movement in the housing in a circumferential direction direction when the brake is applied.

The rings 18 and 19 are maintained concentric with respect to the axis of the brake by radial lugs on the peripheries of the rings which co-operate with guides or pilots in the housing. As illustrated in FIGURE 1 four angularly spaced guides or pilots 31, 32, 33 and 34 project radially inwards from the housing and arcuate surfaces of radially projecting lugs 35 and 36 on each ring 18 and 19 co-operate with the guides 33 and 34. The guides 31 and 32 are equally spaced on opposite sides of a point in the housing normally diametrically opposite to the cam 22, and a radial lug 37 on the ring 18 co-operates with the guide 31 and a radial lug 38 on the ring 19 co-operates with the guide 32. The radial lugs 37 and 38 are extended circumferentially in a direction away from each other and radially outwards to form ears 39 and 40 of which either ear co-operates with its adjacent guide to form an abutment stop for angular movement of either ring according to the direction of rotation of the discs.

Each of the two spaced guides 31 and 32 may be of an axial length only slightly greater than the thickness of the disc with which it co-operates. Alternatively the guides 31 and 32 may be of normal axial length, that is of the same axial length as the guides 33 and 34, and is that case only the appropriate ring is formed with a lug 37 or 38, the axially aligned portion of the peripheral surface of the other ring being spaced radially from the lug.

Each ring is thus directly supported at three angularly spaced positions and is also supported indirectly by the spigot effect of the balls 20 engaging in the co-operating recesses in the ring.

When the shaft 10 and discs 12 and 13 are rotating in the direction indicated by the arrow in FIGURE 1, and the rings 18 and 19 are brought into engagement with the discs by the operation of the cam 22, they tend to rotate with the discs until movement of the ring 19 is arrested by the engagement of the ear 40 on the ring with the guide or pilot 32. The angular movement of the other ring 18 continues and produces a self-energising or servo action uring the rings apart through the engagement of the balls with the co-operating recesses in the ring. When the shaft is rotating in the opposite directcion movement of the ring 18 is arrested by the engagement of the ear 39 on the ring with the guide or pilot 31 and the continued angular movement of the other ring 19 produces the self-energising or servo action.

As described above the guides or pilots 31 and 32 which form the abutment stops are engaged directly by the ears of the rings 18 and 19 but in another arrangement bolts are screwed through the guides and the ends of the bolts project from the guides and form abutment stops against which the ears are adapted to engage so that the position of abutment stops can be adjusted as the friction rings on the discs wear to control the impact with which the plates engage the abutment. This forms a feature of our co-pending British patent application No. 1309 dated January 11, 1963.

I claim:

1. A disc brake comprising a stationary housing, a rotatable shaft within said housing, a pair of axially spaced discs slidably mounted for limited axial movement on said shaft, annular braking surfaces on opposite sides of each disc, braking means for engagement with said annular braking surfaces, axially spaced radial surfaces in said housing, axially separable pressure plates located between the discs for bringing the discs into frictional engagement with the radial surfaces in the housing, actuator means for said brake comprising an abutment on each of said plates in aligned, circumferentially spaced adjacency with each other on one side of the axis of said plates and cam means operably engaging said abutments for urging said abutments away from each other and effect relative angular movement between said pressure plates, co-operating inclined recesses in adjacent faces of said pressure plates, roller means located in the recesses for urging apart the pressure plates on relative angular movement between the pressure plates, angularly spaced pilots projecting radially inwards from the housing and adapted to co-operate with portions of the peripheries of the plates to locate them centrally with respect to the housing, two of said pilots being angularly spaced on opposite sides of a point which is normally diametrically opposite said actuator means, each of said pilots cooperating with one of said pressure plates only and each having a substantially radially extending stop abutment part, and a radial lug on each of said pressure plates engageable with the respective stop abutment parts for arresting angular movement of one or the other of said plates with the rotatable discs when the brake is applied.

2. A disc brake as claimed in claim 1, in which each of the two last mentioned pilots is of an axial length only slightly greater than the axial thickness of the pressure plate with which it cooperates.

3. A disc brake as claimed in claim 1, in which the two last mentioned pilots are of normal axial length and one pressure plate is formed with a machined surface for engagement with one pilot, the adjacent portion of the peripheral surface of the other pressure plate being spaced from that pilot.

4. A disc brake as claimed in claim 1, in which each pressure plate is supported by pilots at three angularly spaced positions and is indirectly supported from the other plate by the spigot effect of the balls or rollers engaging in co-operating recesses in the plates.

References Cited by the Examiner
UNITED STATES PATENTS

| | | | |
|---|---|---|---|
| 2,387,039 | 10/1945 | Parrett | 188—72 |
| 2,831,552 | 4/1958 | Kershner | 188—72 |
| 2,874,807 | 2/1959 | Hahn | 188—72 |

FOREIGN PATENTS

| | | |
|---|---|---|
| 913,624 | 12/1962 | Great Britain. |

MILTON BUCHLER, *Primary Examiner.*

EUGENE G. BOTZ, ARTHUR L. LA POINT,
*Examiners.*

G. HALVOSA, *Assistant Examiner.*